(12) United States Patent
Furusawa et al.

(10) Patent No.: US 7,997,837 B2
(45) Date of Patent: Aug. 16, 2011

(54) POWER TOOL (75) Inventors: Masanori Furusawa, Anjo (JP); Yoshihiro Kasuya, Anjo (JP)

(73) Assignee: Makita Corporation, Anjo (JP)

( * ) Notice: Subject to any disclaimer, the term of this patent is extended or adjusted under 35 U.S.C. 154(b) by 1119 days.

(21) Appl. No.: 11/713,004

(22) Filed: Mar. 2, 2007

(65) Prior Publication Data
US 2007/0209814 A1  Sep. 13, 2007

(30) Foreign Application Priority Data

Mar. 9, 2006 (JP) ................................. 2006-064793

(51) Int. Cl.
*B23B 45/16* (2006.01)
*B23B 31/22* (2006.01)

(52) U.S. Cl. .................. 408/239 R; 279/19.4; 279/19.6; 279/75; 279/144; 279/901; 279/905

(58) Field of Classification Search ........ 279/19.4–19.6, 279/22, 75, 143, 144, 901, 905; 408/239 R; B23B 45/16, 31/22
See application file for complete search history.

(56) References Cited

U.S. PATENT DOCUMENTS

| | | | | |
|---|---|---|---|---|
| 5,603,516 A * | 2/1997 | Neumaier | ..................... | 279/19.5 |
| 5,951,026 A * | 9/1999 | Harman et al. | ............... | 279/143 |
| 6,092,814 A * | 7/2000 | Kageler | ........................ | 279/19.4 |
| 6,536,780 B2 * | 3/2003 | Baumann et al. | ............ | 279/19.4 |
| 6,536,782 B2 * | 3/2003 | Rohm | ............................. | 279/62 |
| 6,691,799 B2 * | 2/2004 | Kuhnle et al. | ................. | 173/132 |
| 7,258,349 B2 * | 8/2007 | Frauhammer et al. | .......... | 279/19 |
| 7,360,606 B2 * | 4/2008 | Saur et al. | ....................... | 173/29 |
| 7,644,929 B2 * | 1/2010 | Frauhammer et al. | ....... | 279/19.4 |
| 7,712,746 B2 * | 5/2010 | Manschitz et al. | .............. | 279/37 |
| 2004/0245731 A1 * | 12/2004 | Frauhammer et al. | ......... | 279/19 |
| 2007/0125564 A1 * | 6/2007 | Koschel et al. | ............... | 173/132 |

FOREIGN PATENT DOCUMENTS

| | | |
|---|---|---|
| DE | 42 03 158 A1 | 8/1993 |
| GB | 2 281 244 A | 3/1995 |
| GB | 2 313 566 A | 12/1997 |
| JP | A 10-58352 | 3/1998 |

* cited by examiner

*Primary Examiner* — Eric A Gates
(74) *Attorney, Agent, or Firm* — Oliff & Berridge, PLC (57) ABSTRACT

It is an object of the invention to provide a technique in a power tool having a detachable bit holder for preventing a bit holder from being detached from the tool body even if unexpected external force is exerted on an operating member for lock release. A representative power tool includes a tool body, a single holder mounting portion. The holder mounting portion removably holds a bit holder selected from multiple kinds of bit holders for holding multiple kinds of tool bits in different manners. Each bit holder includes a cylindrical portion, a through hole formed through the cylindrical portion, an engaging member disposed within the through hole, a cylindrical operating member axially movably fitted on the cylindrical portion between a movement prevented position and a movement allowed position. The operating member is moved to the tool body side in order to be switched from the movement prevented position to the movement allowed position so that the holder mounting portion is allowed to be pulled out of the fitting hole.

4 Claims, 7 Drawing Sheets

POWER TOOL

BACKGROUND OF THE INVENTION

1. Field of the Invention

The present invention relates to a technique for removably attaching multiple kinds of bit holders to a power tool in a manner of replacing with each other.

2. Description of the Related Art

Japanese laid-open patent publication No. 10-58352 discloses a technique for removably attaching multiple kinds of bit holders which hold tool bits in different manners and in a manner of being replaced with each other. The known bit holders each have an adapter which can be inserted into a spindle sleeve on the tool body side. When the adapter is inserted into the bore of the spindle sleeve, a locking member in the form of a ball which is held by the spindle sleeve and can move in the radial direction engages (locks) in a recess formed in the outer surface of the adapter. Thus engagement is maintained by a fixing member disposed on the outside of the adapter. Thus, the bit holder is attached to the slide sleeve and prevented from becoming detached from the slide sleeve. Further, the fixing member can move together with an operating sleeve for lock release which is axially movably disposed on the outside of the adapter. When the operating sleeve is moved away from the tool body (forward) against the biasing force of a compression coil spring, the fixing member releases the engagement of the ball with respect to the recess and allows the adapter to be pulled out of the spindle sleeve.

The known bit holder can be detached from the spindle sleeve when an operating force is applied to the operating sleeve in the direction of moving the operating sleeve away from the tool body. Therefore, during operation, when an external force is exerted by some chance on the opting sleeve in the direction of moving the operating sleeve away from the tool body, the bit holder may become detached from the spindle sleeve.

SUMMARY OF THE INVENTION

Accordingly, it is an object of the invention to provide a technique in a power tool having a detachable bit holder to prevent a bit holder from being detached from the tool body even if unexpected external force is exerted on an operating member for lock release.

The above-described problem can be solved by the features of the claimed invention. According to the invention, a representative power tool is provided to have a tool body, a single holder mounting portion and a recess. The holder mounting portion is disposed in the tip end region of the tool body. The holder mounting portion removably holds a bit holder. The bit holder is selected from multiple kinds of bit holders which hold multiple kinds of tool bits in different manners. The holder mounting portion holds the selected bit holder by replacing the other bit holder attached to the holder mounting portion.

The multiple kinds of tool bits according to this invention may typically include a drill bit, a chisel, a rammer, etc. Further, according to the invention, the multiple kinds of bit holders which hold in different manners may typically include bit holder that allows only hammering operation, bit holder that allows only drilling operation and bit holder that allows hammering and drilling operation.

The recess is formed in an outer surface of the holder mounting portion. Each of the bit holders include a cylindrical portion, a through hole, an engaging member, cylindrical operating member and a biasing member. The cylindrical portion has a fitting hole. The fitting hole is fitted on the holder mounting portion and can be pulled out. The through hole is formed through the cylindrical portion. One end of the through hole is open to an outer surface of the cylindrical portion and the other end is open to the fitting hole.

The engaging member is disposed within the through hole and can move between a locked position and a lock released position. In the locked position, the engaging member protrudes from the one open end of the through hole on the fitting hole side and engages with the recess of the holder mounting portion fitted in the fitting hole. Thus, the holder mounting portion is prevented from being pulled out of the fitting hole. On the other hand, in the lock released position, the engaging member protrudes from the other open end of the through hole on the outer surface side and is disengaged from the recess. Thus, the holder mounting portion is allowed to be pulled out of the fitting hole.

The cylindrical operating member is axially movably fitted on the cylindrical portion and has a movement control region that prevents the engaging member from moving from the locked position to the lock released position, wherein the operating member can move between a movement prevented position in which the movement control region engages with the engaging member and prevents movement of the engaging member and a movement allowed position in which the movement control region is disengaged from the engaging member and allows movement of the engaging member. The biasing member applies a biasing force to the operating member so as normally to hold the operating member in the movement prevented position.

The operating member is moved to the tool body side in order to be switched from the movement prevented position to the movement allowed position so that the holder mounting portion is allowed to be pulled out of the fitting hole. Thus, according to the invention, when the operating member is moved toward the tool body, the lock of the engaging member by the movement control region is released. Therefore, during a predetermined operation using the power tool, even if an external force is exerted by chance on the operating member in the direction of moving the operating member away from the tool body, the operating member is prevented from moving to the movement allowed position. Thus, the bit holder is non-detachably secured to the tool body in this state. Further, even if an external force is exerted by chance on the operating member in the direction of moving the operating member toward the tool body and causes the operating member to move to the movement allowed position, the bit holder is non-detachably secured to the tool body due to such movement of the operating member, because the direction of such movement of the operating member is opposite to the direction of detachment of the bit holder.

When released from such external force, the operating member is returned to the movement prevented position by the biasing force of the biasing member and can hold the engaging member in the locked position via the movement control region. Therefore, according to the invention, unless the user operates the operating member with the intention of detaching the bit holder from the tool body, the tool holder can be held attached to the tool body.

As one aspect of the invention, in order to attach the bit holder to the holder mounting portion, a user grasp the operating member and applies an external force in such a manner as to move the operating member in the axial direction toward the tool body so as to fit the holder mounting portion in the fitting hole. At this time, the operating member and the cylindrical portion move in the axial direction with respect to the tool body against the biasing force of the biasing member, so that the holder mounting portion is fitted in the fitting hole and the engaging member is moved to the locked position. Then, in this state, when the operating member is released from the external axial force, the operating member is moved to the movement prevented position by the biasing force of the biasing member, so that the bit holder is attached to the holder mounting portion. Thus, the user can easily attach the bit holder to the holder mounting portion of the tool body by only one action of applying an external force to the operating member held by the hand in such a manner as to fit the holder mounting portion in the fitting hole of the cylindrical portion.

Further, as one aspect of the invention, in order to detach the bit holder from the holder mounting portion, the user gasps the operating member by one hand and applies an external force in such a manner as to move the operating member to the tool body side in the axial direction, thereby moving the operating member to the movement allowed position. As a result, the engaging member is allowed to move from the locked position to the lock released position. Then, while keeping this allowed state, the user grasps the operating member and applies an external force to move the operating member away from the tool body in the axial direction, so that the holder mounting portion is pulled out of the fitting hole. Thus, according to this invention, the bit holder can be detached from the tool body with ease of operation by one hand.

Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved power tools and method for using such power tools and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 1:
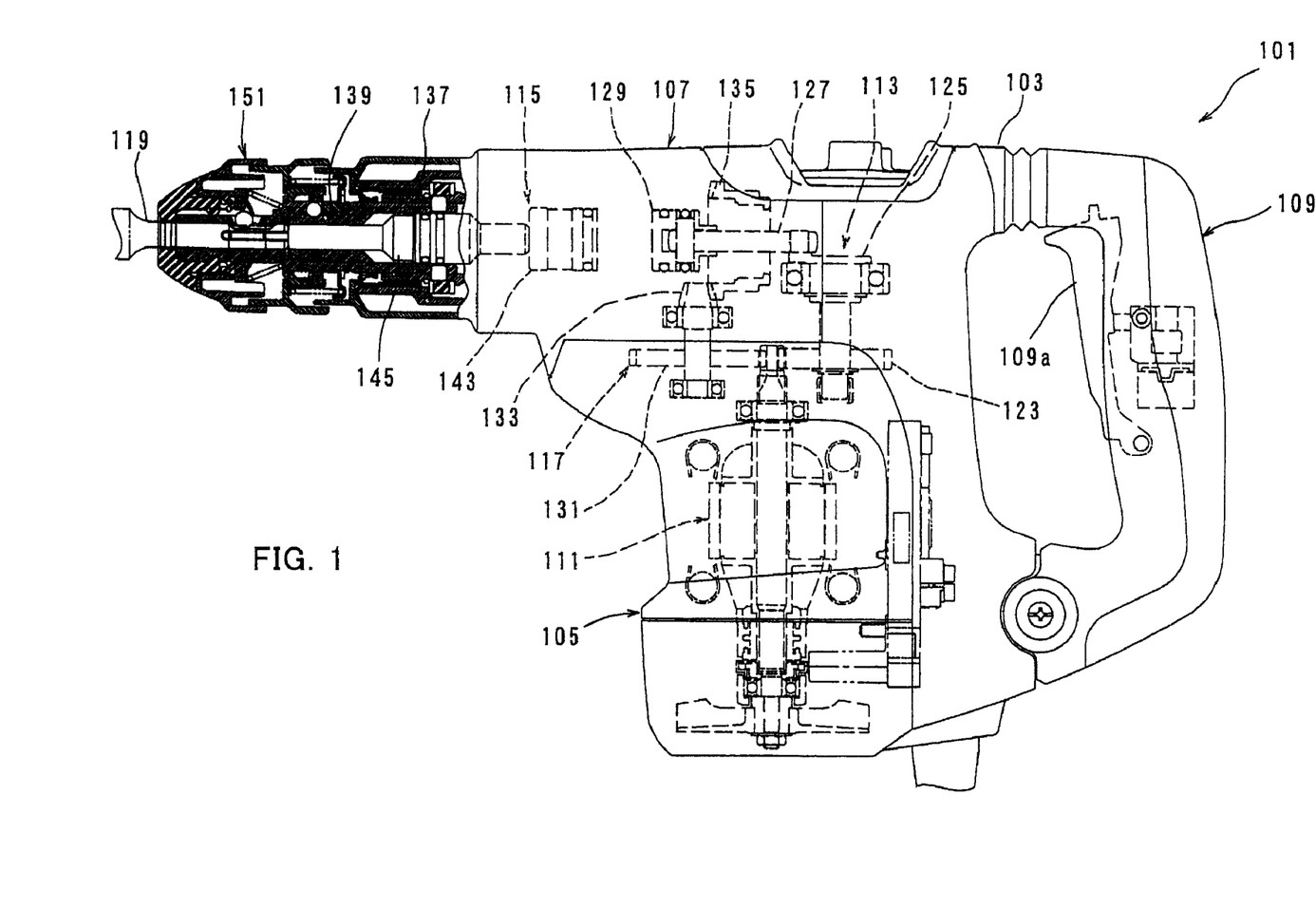
FIG. 1 is a side view pay in section, showing a hammer drill according to an embodiment of the invention.
Figure 2:
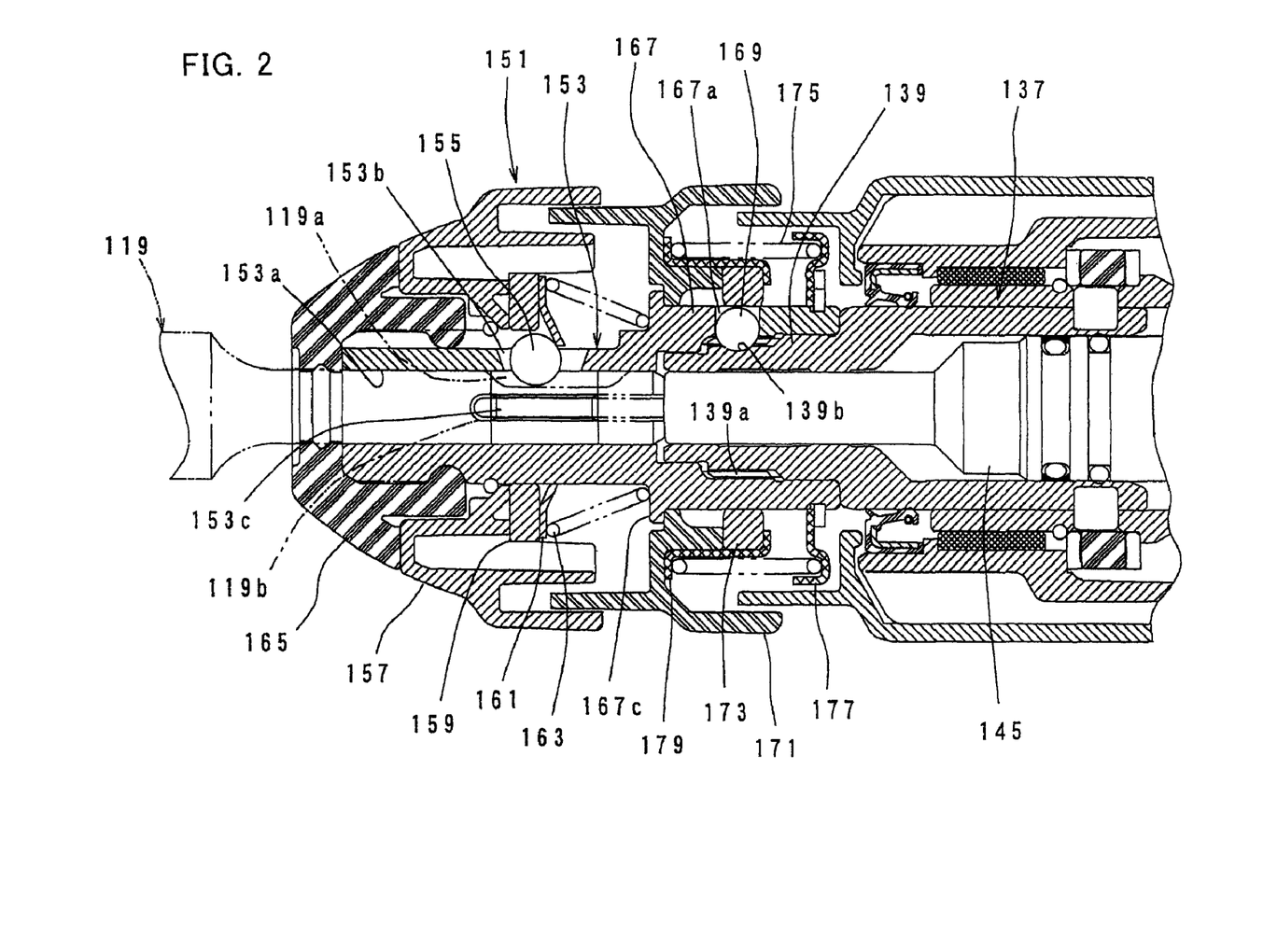
FIG. 2 is a sectional view showing a first chuck in the attached state.
Figure 3:
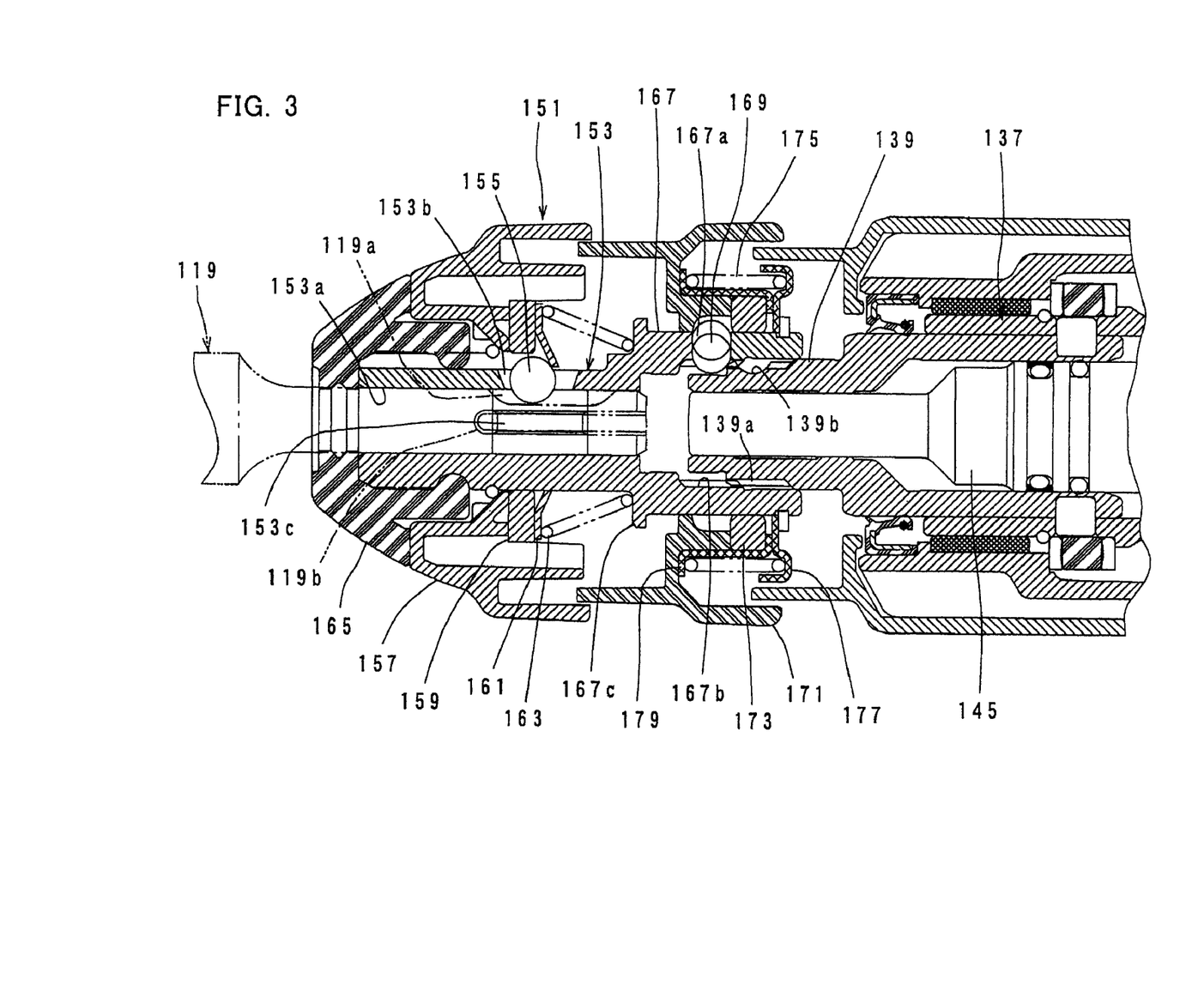
FIG. 3 is a sectional view showing a position of attachment and detachment of the first chuck.
Figure 4:
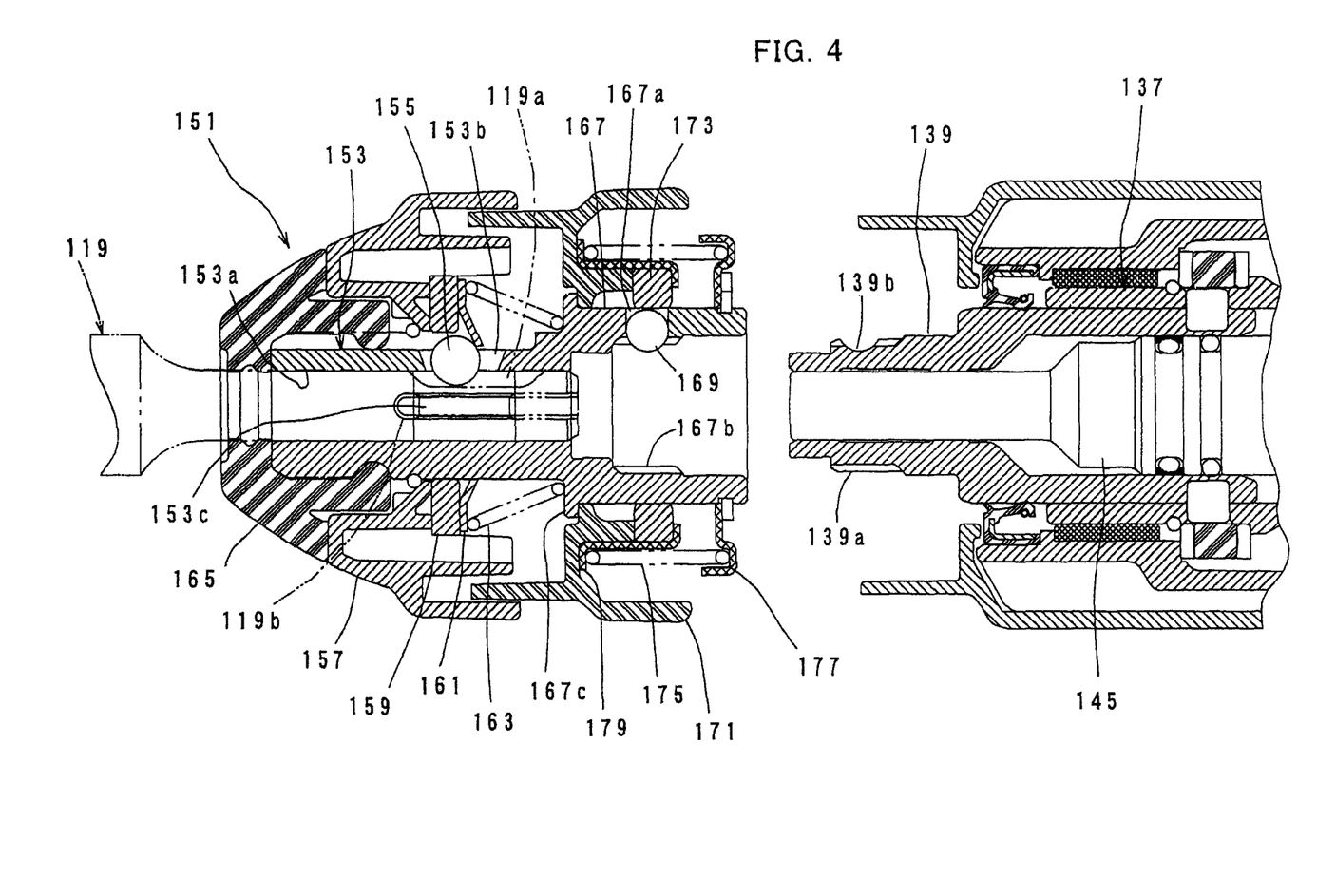
FIG. 4 is a sectional view showing the first chuck in the detached state.
Figure 5:
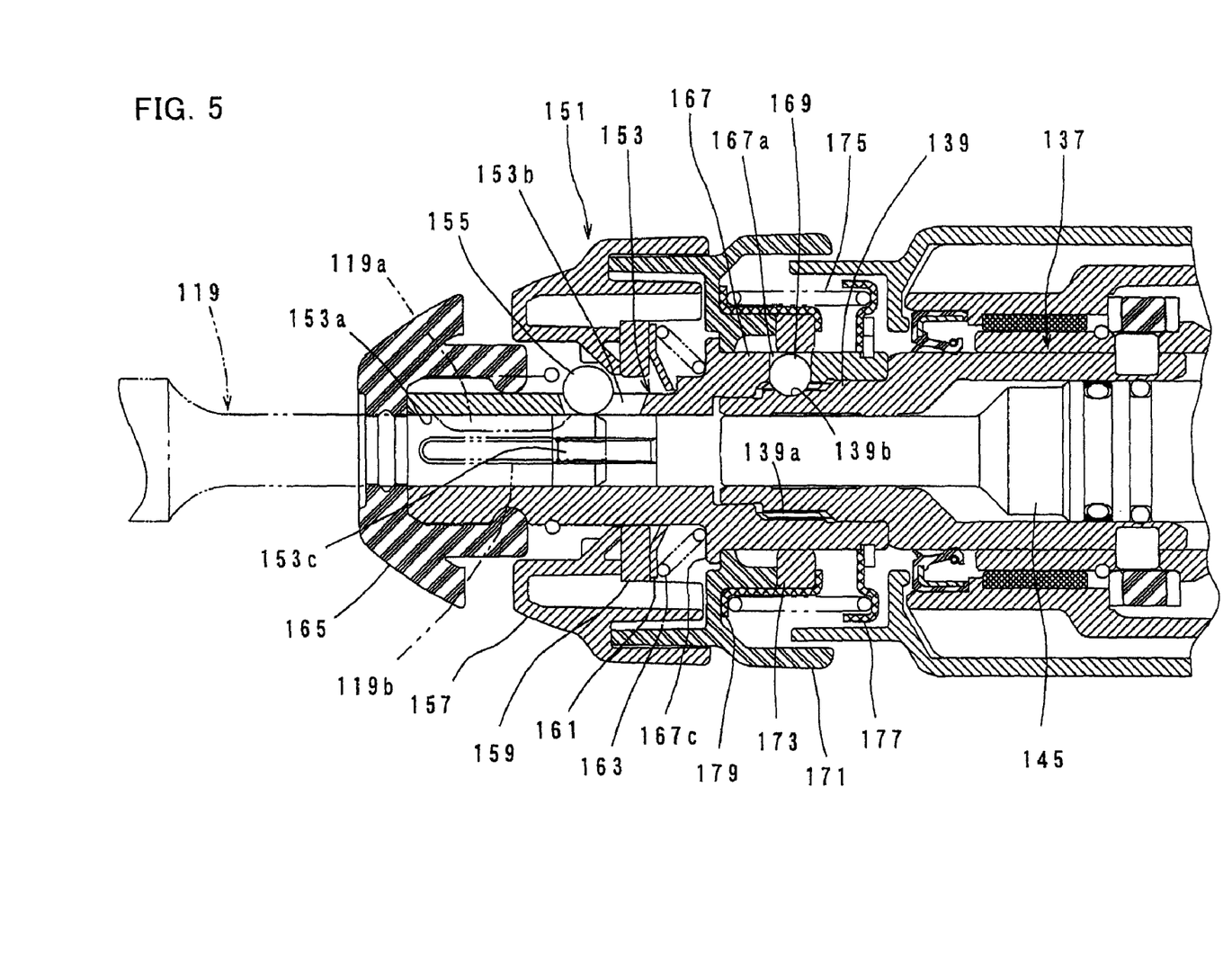
FIG. 5 is a sectional view showing the first chuck when a drill bit is attached to or detached from the first chuck.
Figure 6:
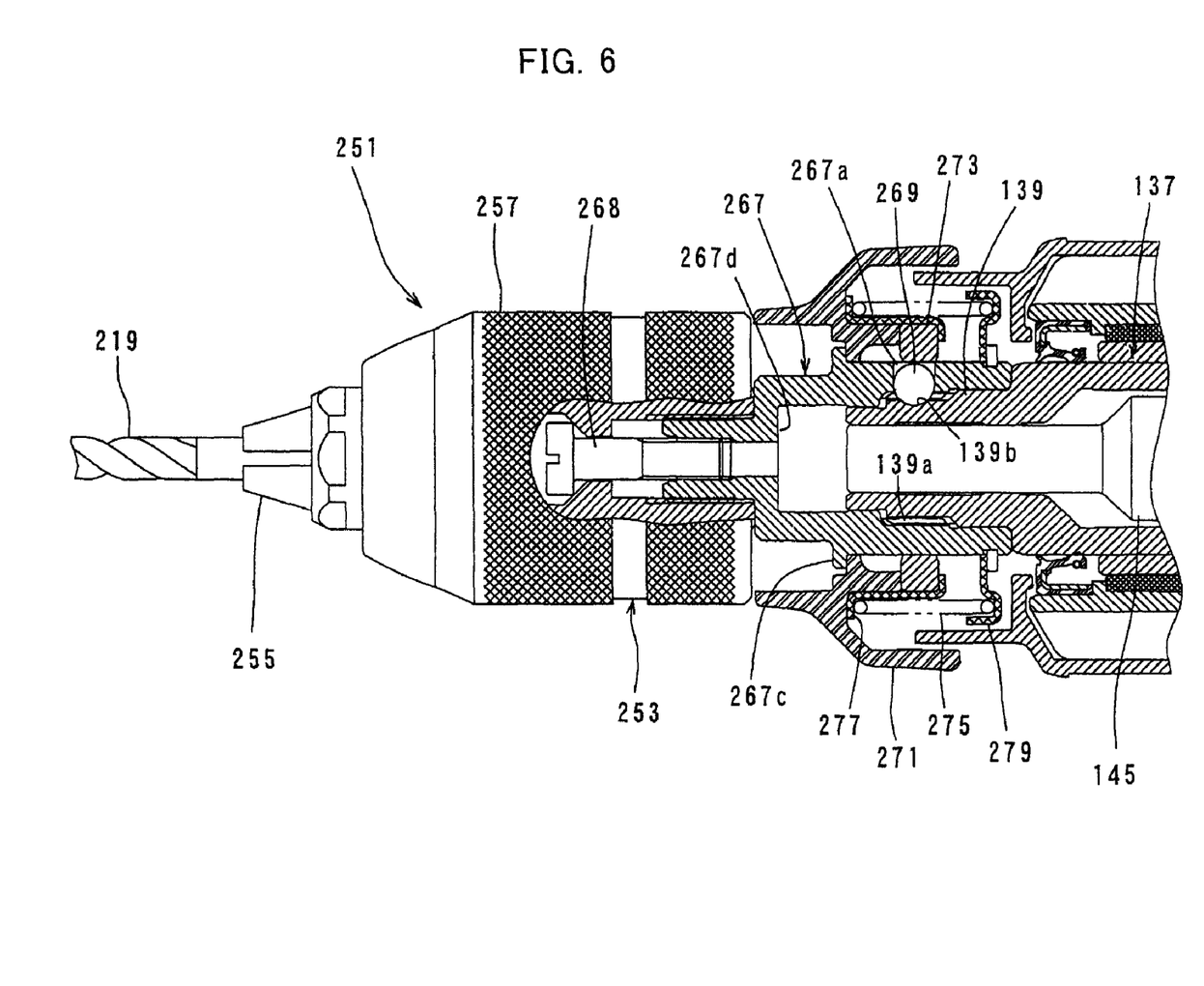
FIG. 6 is a sectional view showing a second chuck in the attached state.
Figure 7:
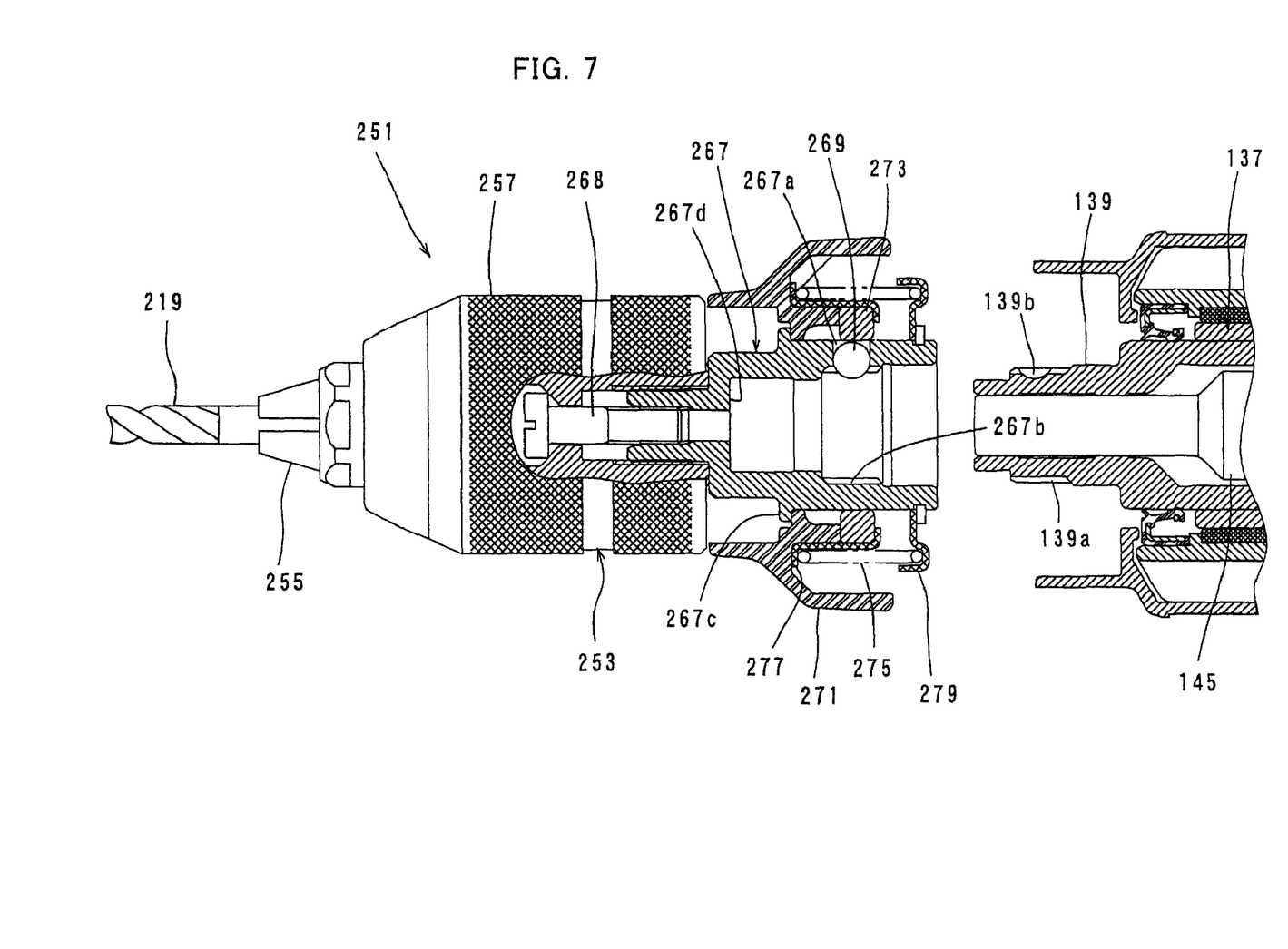
FIG. 7 is a sectional view showing the second chuck in the detached state.

A representative embodiment of the present invention will now be described with reference to FIGS. 1 to 7. FIG. 1 is a side view, partly in section, showing an entire electric hammer drill 101 as a representative embodiment of the power tool according to the present invention. In FIG. 1, a hammer chuck 151 (hereinafter referred to as a first chuck) for holding a drill bit 119 for hammer drilling is shown attached to the hammer drill. FIG. 2 is a sectional view showing the first chuck 151 in the attached state. FIG. 3 is a sectional view showing a position of attachment and detachment of the first chuck 151, FIG. 4 is a sectional view showing the first chuck 151 in the detached state. FIG. 5 is a sectional view showing the first chuck 151 when the drill bit is attached to or detached from the first chuck. Further, FIGS. 6 and 7 are sectional views showing a drill chuck 251 (hereinafter referred to as a second chuck) for holding a drill bit 219 for vibration drilling. FIG. 6 shows the second chuck 251, instead of the first chuck 151, attached to the hammer drill 101. FIG. 7 shows the second chuck 251 in the detached state.

The construction of the hammer drill 101 according to this embodiment will now be explained with reference to FIG. 1. The hammer drill 101 includes a body 103, the drill bit 119 for hammer drilling which is detachably coupled to the tip end region (on the front end side) of the body 103 via the first chuck 151, and a handgrip 109 that is provided on the rear end side of the body 103 or on the side opposite to the drill bit 119. The drill bit 119 is held by the first chuck 151 such that it is allowed to move with respect to the first chuck 151 in its axial direction and prevented from rotating with respect to the first chuck in its circumferential direction. The drill bit 119 and the first chuck 151 are features that correspond to the "tool bit" and the "bit holder", respectively, according to the present invention. In the present embodiment, for the sake of convenience of explanation, the side of the drill bit 119 is taken as the front side and the side of the handgrip 109 as the rear side.

The body 103 includes a motor housing 105 that houses a driving motor 111, and a gear housing 107 that houses a motion converting mechanism 113, a striking mechanism 115 and a power transmitting mechanism 117. The motion converting mechanism 113 is adapted to appropriately convert the rotating output of the driving motor 111 to linear motion and then to transmit it to the striking mechanism 115. As a result, an impact force is generated in the axial direction of the drill bit 119 via the striking mechanism 115. Further, the seed of the rotating output of the driving motor 111 is appropriately reduced by the power transmitting mechanism 117 and then transmitted to the drill bit 19. As a result, the drill bit 119 is caused to rotate in the circumferential direction. The driving motor 111 is driven when a trigger 109a on the handgrip 109 is depressed.

The motion converting mechanism 113, the striking mechanism 115 and the power transmitting mechanism 117 are known in the art, and therefore will be only briefly explained. The motion converting mechanism 131 includes a driven gear 123 that is rotated in a horizontal plane by the driving motor 111, a crank plate 125, a crank arm 127 and a driving element in the form of a piston 129. The crank plate 125, the crank arm 127 and the piston 129 form a crank mechanism. The piston 129 is slidably disposed within a cylinder (not shown) and reciprocates within the cylinder bore when the driving motor 111 is driven.

The striking mechanism 115 includes a striker 143 and an impact bolt 145. The striker 143 is slidably disposed within the bore of the cylinder. The impact bolt 145 is slidably disposed within the tool holder 137 and serves as an intermediate element to transit the kinetic energy of the striker 143 to the drill bit 119. An air chamber is formed within the cylinder and partitioned by the radial wall surface of the cylinder, the piston 129 and the striker 143. The striker 143 is linearly driven via the action of an air spring of the air chamber which is caused by sliding movement of the piston 129. The striker 143 then collides with (strikes) the impact bolt 145 and transmits the so force to the drill bit 119 via the impact bolt 145.

The power transmitting mechanism 117 includes a transmission gear 131 that is driven to rotate in a horizontal plane by the driving motor 111, a small bevel gear 133 that is caused to rotate in a horizontal plane together with the transmission gear 131, a large bevel gear 135 that engages with the small bevel gear 133, and a tool holder 137 that is caused to rotate in a vertical plane together with the large bevel gear 135. The rotational driving force of the tool holder 137 is transmitted to the first chuck 151 mounted on the tip end of the tool holder 137 and to the drill bit 119 held by the first chuck 151.

In the hammer drill 101 thus constructed, when the trigger 109a is depressed by the user and the driving motor 111 is driven, the piston 129 is caused to linearly slide along the cylinder via the motion converting mechanism 113 that is mainly comprised of the crank mechanism. As a result, the striker 143 reciprocates within the cylinder by the action of the air spring function which is caused within the air chamber by the sliding movement of the piston 129. The kinetic energy of the striker 143 which is caused by the collision with the impact bolt 145 is transmitted to the drill bit 119. Meanwhile, the rotating output of the driving motor 111 is transmitted to the tool holder 137 via the power transmitting mechanism 117. As a result the tool holder 137 is driven to rotate in a vertical plane, and the drill bit 119 is rotated together with the first chuck 151 attached to the tool holder 137. Thus, the drill bit 119 performs a drilling operation on a workpiece (e.g. concrete) by the hammering movement in the axial direction and the drilling movement in the circumferential direction.

The hammer drill 101 can be switched not only to the above-mentioned hammer drill mode in which the drill bit 119 is caused to perform both the hammering movement in the axial direction and the drilling movement in the circumferential direction, but to drill mode in which the drill bit 1119 is caused to perform only the drilling movement or to hammer mode in which the drill bit 119 is caused to perform only the hammering movement. A mode switching mechanism is not directly related to the present invention and therefore will not be described.

The first chuck 151 will now be explained with reference to FIGS. 2 to 5. The first chuck 151 includes a cylindrical chuck body 153, a plurality of steel balls 155 and a tool sleeve 157. The chuck body 153 has a bit insertion hole 153a having a circular section into which the drill bit 119 is removably inserted. The steel balls 155 serve to prevent or allow removal of the drill bit 119 from the bit insertion hole 153a. The tool sleeve 157 serves to switch the steel balls 155 between a bit removal prevented position and a bit removal allowed position. A plurality of slots 153b are formed in the chuck body 153 at predetermined intervals in the circumferential direction and extend in the axial direction of the chuck body 153. The steel balls 155 are disposed in the slots 153b. The steel balls 155 can move in the axial direction within the associated slots 153b and can be displaced in the radial direction of the chuck body 153.

The tool sleeve 157 is fitted on the chuck body 153 such that it can move in the axial direction. A control ring 159 is disposed on the inner periphery of the tool sleeve 157 and prevents radially outward displacement of the steel balls 155. Further, a control plate 161 is disposed on the rear side of the control zing 159. The control plate 161 can move in the axial direction of the tool sleeve 157 with respect to the tool sleeve 157. The control plate 161 is pressed against the rear surface of the control ring 159 by a biasing spring 163 disposed between the control plate 161 and the chuck body 153. The biasing force of the biasing spring 163 acts as a force of pressing the tool sleeve 157 forward. Therefore, the front end of the tool sleeve 157 contacts a cap 165 attached to the front end of the chuck body 153, so that the tool sleeve 157 holds the steel balls 155 in the bit removal prevented position.

In order to attach or detach the drill bit 119 with respect to the first chuck 151, the user grasps the tool sleeve 157 and moves the tool sleeve 157 rearward against the biasing force of the biasing spring 163. In this state, the drill bit 119 is allowed to be attached or detached. This state is shown in FIG. 5. When the user moves the tool sleeve 157 rearward, the steel balls 155 are released from the control ring 159 and allowed to move radially outward. In this state, when the drill bit 119 is inserted into the bit insertion hole 153a, the steel balls 155 are pressed by the end of the drill bit 119 and once moved radially outward. Thereafter, the steel balls 155 engage with engagement grooves 119a formed in the outer periphery of the shank of the drill bit 119. In this state, when the user releases the tool sleeve 157, the tool sleeve 157 is moved forward by the biasing force of the biasing spring 163, and the control ring 159 holds the steel balls 155 engaged with the associated engagement grooves 119a. Thus, the drill bit 119 is prevented from slipping out. The engagement groves 119a of the drill bit 119 extend to a predetermined length in the axial direction. Therefore, the drill bit 119 is allowed to move a predetermined distance in the axial direction with respect to the chuck body 153. Further, when the drill bit 119 is pulled forward in the state in which the tool sleeve 157 is moved rearward, the drill bit 119 can be detached from the first chuck 151 while pushing the steel balls 155 radially outward.

Further, a plurality of radially protruding torque transmitting parts in the form of protrusions 153c are formed on the inner peripheral surface of the bit insertion hole 153a of the chuck body 153 at predetermined intervals in the circumferential direction. The torque transmitting protrusions 153c extend to a predetermined length in the axial direction of the chuck body 153. Torque transmission grooves 119b are formed in the outer periphery of the shank of the drill bit 119 and engage with the protrusions 153c when the drill bit 119 is inserted into the bit insertion hole 153a. In this engagement, the rotating force of the chuck body 153 is transmitted to the drill bit 119. Further, each of the torque transmission grooves 119b is open at its shank end such that the drill bit 119 is positioned in the circumferential direction when the drill bit 119 is inserted into the bit insertion hole 153a. Thus, the drill bit 119 is held by the first chuck 151 such that it is allowed to move in its axial direction.

A structure for removably attaching the first chuck 151 to the tool holder 137 will now be explained. A chuck mounting part 139 is formed on the tip end portion (front end portion) of the tool holder 137. A spline shaft 139a and engagement recesses 139b are formed in the outer peripheral surface of the chuck mounting part 139. The chuck mounting part 139 is a feature that corresponds to the "holder mounting portion" according to this invention.

The first chuck 151 has a cylindrical mounting portion 167 integrally formed on the rear end of the chuck body 153 such that the first chuck 151 is removably attached to the chuck mounting part 139. The cylindrical mounting portion 167 is a feature that corresponds to the "cylindrical portion" according to this invention. The cylindrical mounting portion 167 has a spline hole 167b and a plurality of locking steel balls

169. The spline hole 167b can be fitted onto the spline shaft 139a of the chuck mounting portion 139 and can be pulled out. The steel balls 169 can engage with the engagement recesses 139b of the chuck mounting part 139 and thereby serve to prevent the cylindrical mounting portion 167 from slipping out in the axial direction. The chuck body 153 can be rotated together with the tool holder 137 by spline engagement of the cylindrical mounting portion 167 with the chuck mounting portion 139. The steel balls 169 and the spline hole 167b are features that correspond to the "engaging member" and the "fitting hole", respectively, according to this invention.

A plurality of through holes 167a are formed in the cylindrical mounting portion 167 at predetermined intervals in the circumferential direction of the cylindrical mounting portion 167 and extend radially through the cylindrical mounting portion 167. The steel balls 169 are radially movably disposed in the trough holes 167a. The steel balls 169 can move between an engagement position in which the steel balls engage with the engagement recesses 139b of the chuck mounting part 139 and a disengagement position in which such engagement is released. The engagement position and the disengagement position of the steel balls 169 are features that correspond to the "locked position" and the "lock released position", respectively, according to this invention.

A lock releasing slide sleeve 171 is fitted on the cylindrical mounting portion 167 and is manually operated by the user. The slide sleeve 171 is a feature that corresponds to the "operating member" according to this invention. The slide sleeve 171 can be moved in the axial direction of the chuck body 153 (the axial direction of the drill bit 119). A lock ring 173 is mounted to the slide sleeve 171 such that it can move together with the slide sleeve 171. The lock ring 173 locks the steel balls 169 in the engagement position when the lock ring 173 is located on the outer side of the steel balls 169, while the lock ring 173 releases the lock of the steel balls 169 when the lock ring 173 is moved rearward away from the steel balls 169. The lock ring 173 is a feature that corresponds to the "movement control region" according to this invention.

The slide sleeve 171 is biased forward (to the drill bit 119 side) by a compression coil spring 175. The compression coil spring 175 is a feature that corresponds to the "biasing member" according to this invention. The compression coil spring 175 is disposed on the outside of the lock ring 173 and between a spring receiving ring 177 fixed to the cylindrical mounting portion 167 and a spring receiving ring 179 fixed to the slide sleeve 171. The slide sleeve 171 is pushed forward by the biasing force of the compression coil spring 175 and contacts a stopper 167c that is formed on the outer diameter side of the cylindrical mounting portion 167. Thus, the end of the forward movement of the slide sleeve 171 is defined by such contact with the stopper 167c. When the slide sleeve 171 is placed in the forward position, the lock ring 173 is located on the outer side of the steel balls 169 and prevents the steel balls 169 from moving radially outward. When the slide sleeve 171 is moved rearward (to the body 103 side) against the biasing force of the compression coil spring 175, the lock ring 173 is moved away from the steel balls 169 and allows the steel balls 169 to move radially outward. The forward position and the rearward position of the slide sleeve 171 are features that correspond to the "movement prevented position" and the "movement allowed position", respectively, according to this invention.

Operation of attaching and detaching the first chuck 151 having the above-mentioned construction with respect to the chuck mounting portion 139 will now be explained. As shown in FIG. 4, in the state in which the first chuck 151 is detached from the chuck mounting portion 139, the slide sleeve 171 is pushed forward by the biasing force of the compression coil spring 175 and placed in the forward position defined by the stopper 167c. Further, the lock ring 173 is located on the outer-side position to prevent movement of the steel balls 169, so that the steel balls 169 protrude to the spline hole 167b side.

In this state, in order to attach the first chuck 151 to the chuck mounting portion 139, with the slide sleeve 171 in the hand, the user linearly moves the slide sleeve 171 toward the body 103 and fits the spline hole 167a of the cylindrical mounting portion 167 of the chuck body 153 onto the spline shaft 139a of the chuck mounting portion 139. During this process, the steel balls 169 contact the shank end (the front end) of the spline shaft 139a and thereby prevents the cylindrical mounting portion 167 from moving rearward to the body 103 side. This state is shown in FIG. 3. In this state of contact when the user applies a force to the slide sleeve 171 in order to further move the slide sleeve 171 rearward, the slide sleeve 171 and the lock ring 173 are moved rearward while compressing the compression coil spring 175. Thus, the lock ring 173 is moved rearward from the outer-side position on the outer side of the steel balls 169 and allows the steel balls 169 to move radially outward within the associated through holes 167a. Therefore, the steel balls 169 move onto the outer diameter part of the spline shaft 139a over the shank end of the spline shaft 139a, so that the cylindrical mounting portion 167 is allowed to move. In this state, when the cylindrical mounting portion 167 is moved to a predetermined rearward position, the spline hole 167b is fitted onto the spline shaft 139a, and the steel balls 169 engage with the associated engagement recesses 139b. In this state, when the force exerted upon the slide sleeve 171 is released, the slide sleeve 171 is moved to the forward position by the biasing force of the compression coil spring 175, and the lock ring 173 is placed on the outer side of the steel balls 169. Thus, the steel balls 169 are locked in engagement with the engagement recesses 139b.

As mentioned above, the user can easily attach the first chuck 153 to the chuck mounting portion 139 by only one action of linearly moving the slide sleeve 171 toward the body 103, with the slide sleeve 171 in the hand, in such a manner as to fit the spline hole 167b of the cylindrical mounting portion 167 onto the spline shaft 139a of the chuck mounting portion 139. The relative positions of the engagement recesses 139b and the steel balls 169 in the circumferential direction may be marked on the body 103 and the first chuck 151, respectively. Such marking facilitates positioning the first chuck 151 with respect to the body 103 in the circumferential direction when the user attaches the first chuck 151 to the chuck mounting portion 139.

In order to detach the first chuck 151 from the chuck mounting portion 139, the user grasps the slide sleeve 171 and moves it rearward (to the body 103 side). Thus the locking 173 is also moved rearward so that the lock of the steel balls 169 is released. Therefore, while keeping this state (the relative positional relationship), the user moves the chuck body 153 forward, or substantially holds the tool sleeve 157 and moves it forward, so that the cylindrical mounting portion 167 is slipped off the chuck mounting portion 139. Thus, according to this embodiment, the first chuck 151 can be detached from the chuck mounting portion 139 with ease of operation by one hand.

According to this embodiment, the steel balls 169 are disengaged thorn the engagement recesses 139b when the lock ring 173 is moved rearward together with the slide sleeve 171. In other words, the lock of the steel balls 169 is released when the slide sleeve 171 is moved toward the body 103. Therefore, during operation using the hammer drill 101, even if an external force is exerted by some chance on the slide sleeve 171 in the direction of moving the slide sleeve 171 away from the body 103, the slide sleeve 171 and the lock ring 173 are prevented from moving in such direction and held in the locked position. Thus, the lock of the steel balls 169 is not released, so that the first chuck 151 never becomes detached from the chuck mounting portion 139.

Further, even if an external force is exerted by some chance on the slide sleeve 171 in the direction of moving the slide sleeve 171 toward the body 103 and causes the slide sleeve 171 and the lock ring 173 to move toward the body 103, the first chuck 151 never becomes detached from the chuck mounting portion 139, because the direction of such movement of the slide sleeve 171 is opposite to the direction of detachment of the first chuck 151 from the chuck mounting portion 139. When released from such external force, the slide sleeve 171 and the lock ring 173 are returned to the original ford position by the biasing force of the compression coil spring 175. Thus, the steel balls 169 can be locked. Therefore, according to this embodiment, unless the user operates the slide sleeve 171 with the intention of detaching the first chuck 151 from the chuck mounting portion 139, the first chuck 151 can be held attached to the chuck mounting portion 139.

Next, the construction of a second chuck 251 which can be attached, instead of the first chuck 151, to the chuck mounting portion 139 will now be explained with reference to FIGS. 6 and 7. The second chuck 251 is a claw chuck of the type which holds a drill bit 219 for vibration drills such that the drill bit 219 is prevented from moving in the axial direction and rotating on its axis with respect to the second chuck 251. The drill bit 219 for vibration drills and the second chuck 251 are features that correspond to the "tool bit" and the "bit holder", respectively, according to this invention. The second chuck 251 includes a chuck body 253. The chuck body 253 has a bit insertion hole having a circular section into which the drill bit 219 is inserted, and a plurality of (e.g. this) holding claws 255 for holding the drill bit 219 inserted into the bit insertion hole. The holding claws 255 can be opened and closed by turning an adjusting ring 257 that is rotatably fitted on the chuck body 253. Such opening and closing of the holding claws 255 allow attachment and detachment of the drill bit 219.

A cylindrical chuck holder 267 is coaxially connected to the rear end of the chuck body 253 via a fastening bolt 268. As an alternative to this construction of this embodiment, the chuck body 253 and the chuck holder 267 may be integrally formed with each other. The chuck holder 267 is a feature that corresponds to the "cylindrical portion" according to this invention. The chuck holder 267 corresponds to the above-described cylindrical mounting portion 167 of the first chuck 151 and can be removably mounted on the chuck mounting part 139 of the tool holder 137. The mounting structure of the chuck holder 267 is exactly the same as in the case of the first chuck 151.

Specifically, the chuck holder 267 has a spline hole 267b and a plurality of steel balls 269. The spline hole 267b can be fitted onto the spline shaft 139a of the chuck mounting portion 139. The steel balls 269 engage with the engagement recesses 139b of the chuck mounting part 139 when the chuck holder 267 is splint fitted on the chuck mounting part 139. The spline hole 267b and the steel balls 269 are features that correspond to the "fitting hole" and the "engaging member", respectively, according to this invention. A plurality of through holes 267a are formed in the chuck holder 267 and extend radially through the chuck holder 267. The steel balls 269 are disposed in the through holes 267a and can move between an engagement position in which the steel balls engage with the engagement recesses 139b of the chuck mounting part 139 and a disengagement position in which such engagement is released. The engagement position and the disengagement position of the steel balls 269 are features that correspond to the "locked position" and the "lock released position", respectively, according to this invention.

A lock releasing slide sleeve 271 is designed to be manually operated by the user and fitted on the chuck holder 267 such that the slide sleeve 271 can be moved in the axial direction of the chuck holder 267. A lock ring 273 is mounted to the slide sleeve 271 such that it can move together with the slide sleeve 271. The slide sleeve 271 and the lock ring 273 are features that correspond to the "operating member" and the "movement control region", respectively, according to this invention. The lock ring 273 locks the steel balls 269 in the engagement position when the lock ring 273 is located on the outer side of the steel balls 269, while the lock ring 273 releases the lock when the lock ring 273 is moved rearward away from the steel balls 269.

The slide sleeve 271 is biased forward (to the drill bit 219 side) by a compression coil spring 275. The compression coil spring 275 is a feature that corresponds to the "biasing member" according to this invention. The compression coil spring 275 is disposed between a spring receiving ring 277 fixed to the chuck holder 267 and a spring receiving ring 279 fixed to the slide sleeve 271. A stopper 267c is formed on the chuck holder 267 and defines the end of the forward movement of the slide sleeve 271 by contact with the slide sleeve 271 which is biased forward by the biasing force of the compression coil spring 275. When the slide sleeve 271 is placed in the forward position, the lock ring 273 is located on the outer side of the steel balls 269 and prevents the steel balls 269 from moving radially outward when the slide sleeve 271 is moved rearward (to the body 103 side) against the biasing force of the compression coil spring 275, the lock ring 273 is moved away from the steel balls 269 and allows the steel balls 269 to move radially outward. The forward position and the rearward position of the slide sleeve 271 are features that correspond to the "movement prevented position" and the "movement allowed position", respectively, according to this invention.

FIG. 6 shows the state in which the second chuck 251, instead of the first chuck 151, is attached to the chuck mounting portion 139 of the hammer drill 101. In this state, as shown, a bore bottom 267d of the chuck holder 267 is opposed to the tip end (front end) of the impact bolt 145 and can contact it. Therefore, when the drilling operation using the drill bit 219 for vibration drills is performed in hammer drill mode by rotation and striking movement of the drill bit 219, the striking force of the impact bolt 145 is transmitted from the impact bolt 145 to the drill bit 219 via the chuck holder 267 and the chuck body 253.

The second chuck 251 is attached to the chuck mounting portion 139 in exactly the same manner as the first chuck 151. Further, FIG. 7 shows the state in which the second chuck 251 is detached from the chuck mounting portion 139, and the manner of the detachment is also exactly the same as that of the first chuck 151. Therefore, the second chuck 251 is attached to and detached from the chuck mounting portion 139 in the same manner as the first chuck 151. Specifically, the user can easily attach and detach the second chuck 251 with respect to the chuck mounting portion 139 by grasping the slide sleeve 271 or grasping the slide sleeve 271 and the chuck body 253 and linearly moving the second chuck 251 in the axial direction.

Further, during operation with the second chuck 251 attached to the chuck mounting portion 139, when an external force is exerted by some chance on the slide sleeve 271 in the direction of moving the slide sleeve 271 away from the body 103, or when an external force is exerted by some chance on the slide sleeve 271 in the direction of moving the slide sleeve 271 toward the body 103 and causes the slide sleeve 271 and the lock ring 273 to move toward the body 103, in either case, like the first chuck 151, the second chuck 251 can be prevented from becoming detached from the chuck mounting portion 139.

Further, in this embodiment, the hammer drill 101 is described as an example of the power tool, but the invention may be applied to a hammer which performs a hammering operation by linear striking movement of the tool bit.

DESCRIPTION OF NUMERALS 101 hammer drill
103 body
105 motor housing
107 gear housing
109 handgrip
109a trigger
111 driving motor
113 motion converting mechanism
115 string mechanism
117 power transmitting mechanism
119 drill bit (tool bit)
119a engagement groove
119b torque transmission groove
123 driven gear
125 crank plate
127 crank arm
129 piston
131 transmission gear
133 small bevel gear
135 large bevel gear
137 tool holder
139 chuck mounting portion
139a spline shaft
139b engagement recess
143 striker
145 impact bolt
151 first chuck
153 chuck body
153a bit insertion hole
153b slot
153c protrusion
155 steel ball
157 tool sleeve
159 control ring
161 control plate
163 biasing spring
165 cap
167 cylindrical mounting portion
167a through hole
167b spline hole
167c stopper
169 steel ball
171 slide sleeve
173 lock ring
175 compression coil spring
177 spring receiving ring
179 spring receiving ring
251 second chuck
253 chuck body
255 holding claw
257 adjusting ring
267 chuck holder
267a through hole
267b spline hole
267c stopper
267d bore bottom
268 fastening bolt
269 steel ball
271 slide sleeve (operating member)
273 lock ring (movement control region)
275 compression coil spring (biasing member)
277 spring receiving ring
279 spring receiving ring

What is claimed is:

1. A power tool comprising:
a tool body,
a single holder mounting portion disposed in the tip end region of the tool body, the holder mounting portion removably holding a bit holder that is selected from multiple kinds of bit holders which hold multiple kinds of tool bits in different manners, the holder mounting portion holding the selected bit holder by replacing an other bit holder attached to the holder mounting portion,
a recess formed in an outer surface of the holder mounting portion,
wherein each bit holder comprises:
a cylindrical portion having a fitting hole that is fitted on the holder mounting portion and can be pulled out,
a through hole formed through the cylindrical portion such that one end of the through hole is open to an outer surface of the cylindrical portion and the other end is open to the fitting hole, and
an engaging member that is disposed within the through hole and that moves between a locked position and a lock released position, wherein, in the locked position, the engaging member protrudes from the one open end of the through hole on the fitting hole side and engages with the recess of the holder mounting portion fitted in the fitting hole, so that the holder mounting portion is prevented from being pulled out of the fitting hole, while, in the lock released position, the engaging member protrudes from the other open end of the through hole on the outer surface side and is disengaged from the recess, so that the holder mounting portion is allowed to be pulled out of the fitting hole,
a cylindrical operating member that is axially movably fitted on the cylindrical portion and has a movement control region that prevents the engaging member from moving from the locked position to the lock released position, the operating member being moved between a movement prevented position in which the movement control region engages with the engaging member and prevents movement of the engaging member and a movement allowed position in which the movement control region is disengaged from the engaging member and allows movement of the member member, and
a biasing member that applies a biasing force to the operating member to normally hold the operating member in the movement prevented position,
wherein the operating member is moved to the tool body side in order to be switched from the movement prevented position to the movement allowed position so that the holder mounting portion is allowed to be pulled out of the fitting hole, and the operating member is connected to the cylindrical portion when the holder mounting portion is detached upon disengagement.

2. The power tool as defined in claim 1, wherein, in order to attach the bit holder to the holder mounting portion, a user grasps the operating member and applies an external force to move the operating member in the axial direction toward the tool body so as to fit the holder mounting portion in the fitting hole, the operating member and the cylindrical portion moving in the axial direction with respect to the tool body against the biasing force of the biasing member, so that the holder mounting portion is fitted in the fitting hole and the engaging member is moved to the locked position, and in this state, when the operating member is released from the external axial force, the operating member is moved to the movement prevented position by the biasing force of the biasing member, so that the bit holder is attached to the holder mounting portion.

3. The power tool as defined in claim 1, wherein, in order to detach the bit holder from the holder mounting portion, the user grasps the operating member by one hand and applies an external force in such a manner as to move the operating member to the tool body side in the axial direction, thereby moving the operating member to the movement allowed position, the engaging member being allowed to move from the locked position to the lock released position, and then, while keeping this an allowed state, the user grasps the operating member and applies an external force to move the bit holder away from the tool body in the axial direction, so that the holder mounting portion is pulled out of the fitting hole.

4. The power tool as defined in claim 1, wherein the multiple kinds of bit holders comprise at least by a bit holder to hold a tool bit used for a hammer drill and a bit holder to hold a tool bit used for a vibration drill.

* * * * *